(12) United States Patent
Ogino

(10) Patent No.: US 8,207,076 B2
(45) Date of Patent: *Jun. 26, 2012

(54) OPTICAL GLASS

(75) Inventor: Mitchiko Ogino, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 225 days.

This patent is subject to a terminal disclaimer.

(21) Appl. No.: 12/237,857

(22) Filed: Sep. 25, 2008

(65) Prior Publication Data

US 2009/0082190 A1   Mar. 26, 2009

(30) Foreign Application Priority Data

Sep. 25, 2007   (JP) ................................ 2007-246890

(51) Int. Cl.
*C03C 3/068*   (2006.01)
(52) U.S. Cl. ............... 501/78; 501/50; 501/51; 501/79
(58) Field of Classification Search .................. 501/50, 501/51, 78, 79
See application file for complete search history.

(56) References Cited

U.S. PATENT DOCUMENTS

| | | | | |
|---|---|---|---|---|
| 458,479 | A * | 8/1891 | Noriega ........................ | 381/419 |
| 4,120,732 | A * | 10/1978 | Komorita et al. ............... | 501/42 |
| 4,472,511 | A * | 9/1984 | Mennemann et al. .......... | 501/78 |
| 4,612,295 | A * | 9/1986 | Sagara ............................ | 501/51 |
| 4,839,314 | A * | 6/1989 | Boudot et al. .................. | 501/78 |
| 6,645,894 | B2 | 11/2003 | Endo | |
| 6,912,093 | B2 * | 6/2005 | Endo ............................... | 359/642 |
| 7,091,145 | B2 * | 8/2006 | Wolff et al. ..................... | 501/78 |
| 7,138,349 | B2 * | 11/2006 | Uehara et al. .................. | 501/78 |
| 7,297,647 | B2 * | 11/2007 | Wolff et al. ..................... | 501/78 |
| 2004/0023787 | A1 * | 2/2004 | Wolff et al. ..................... | 501/78 |
| 2004/0220041 | A1 * | 11/2004 | Isowaki et al. ................. | 501/78 |
| 2005/0107240 | A1 * | 5/2005 | Uehara ............................ | 501/78 |
| 2005/0209087 | A1 * | 9/2005 | Wolff et al. ..................... | 501/78 |
| 2006/0100085 | A1 * | 5/2006 | Uehara ............................ | 501/78 |
| 2006/0189473 | A1 * | 8/2006 | Endo ............................... | 501/78 |
| 2007/0015651 | A1 * | 1/2007 | Endo ............................... | 501/50 |
| 2008/0220961 | A1 * | 9/2008 | Uehara et al. ................... | 501/78 |
| 2008/0287280 | A1 * | 11/2008 | Onoda et al. .................... | 501/78 |
| 2009/0088310 | A1 * | 4/2009 | Suzuki et al. ................... | 501/78 |

FOREIGN PATENT DOCUMENTS

| | | |
|---|---|---|
| CN | 1532161 A | 9/2004 |
| DE | 11 2006 001 466 T5 | 5/2008 |
| JP | 50-14712 A | 2/1975 |
| JP | 56-160340 A | 12/1981 |
| JP | 2002-284542 A | 10/2002 |
| JP | 2004-161506 A | 6/2004 |
| JP | 2005-306732 A | 11/2005 |
| JP | 2006-248897 A | 9/2006 |
| JP | 2007269584 A * | 10/2007 |
| WO | 2006/132387 A1 | 12/2006 |

OTHER PUBLICATIONS

Derwent Abstract 1982-06548E of JP 56-160340 A, Dec. 10, 1981.*
Derwent Abstract 1975-79258W of JP 50-014712 A, Feb. 17, 1975.*
Derwent Abstract 2006-700017 and machine translation of JP 2006-248897 A, Sep. 21, 2006.*
Chinese Office Action dated Oct. 19, 2011, issued in corresponding Chinese Patent Application No. 200810161830.7.
German Office Action, issued in corresponding German Patent Application No. 10 2008 048 330.3.

* cited by examiner

*Primary Examiner* — Karl Group
*Assistant Examiner* — Elizabeth A Bolden
(74) *Attorney, Agent, or Firm* — Westerman, Hattori, Daniels & Adrian, LLP

(57) ABSTRACT

A high-refractive index, low-dispersion optical glass which is small in a change of imaging properties due to a change in temperature of the use environment, specifically one capable of realizing an absolute value of multiplication ($\alpha \times \beta$) of an average coefficient of linear expansion ($\alpha$) at from $-30$ to $+70°$ C. and a photoelastic constant ($\beta$) at a wavelength of 546.1 nm of not more than $130 \times 10^{-12}$ $°C.^{-1} \times nm \times cm^{-1} \times Pa^{-1}$, is manufactured without using large qualities of components which are high in an environmental load and scarce mineral resources. The optical glass of the invention has an absolute value of multiplication ($\alpha \times \beta$) of an average coefficient of linear expansion ($\alpha$) at from $-30$ to $+70°$ C. and a photoelastic constant ($\beta$) at a wavelength of 546.1 nm of not more than $130 \times 10^{-12}$ $°C.^{-1} \times nm \times cm^{-1} \times Pa^{-1}$; and contains more than 0% of $SiO_2$, $B_2O_3$ and $La_2O_3$, more than 13% and less than 20% of ($ZrO_2 + Nb_2O_5$) and less than 2.0% of ZnO in terms of % by mass on the oxide basis.

12 Claims, No Drawings

OPTICAL GLASS

BACKGROUND OF THE INVENTION

1. Field of the Invention

The present invention relates to a high-refractive index, low-dispersion optical glass, specifically an optical glass having a refractive index (nd) of 1.75 or more and an Abbe's number (vd) of 35 or more and to an optical element obtained by utilizing this optical glass, such as lenses or prisms. In particular, the invention relates to a high-refractive index, low-dispersion optical glass which is favorable for projection lenses or prisms of optical instruments represented by a camera or a projector required to have imaging properties with high precision and an optical element and an optical instrument prepared from that optical glass.

2. Description of the Related Art

In recent years, digitalization and high definition of optical instruments advance, and optical elements to be used for not only imaging instruments such as digital cameras or video cameras but also image reproduction (projection) instruments such as projectors or projection television sets are required to have high performance. In particular, a high-refractive index, low-dispersion glass is very high in demand as an optical element material such as various lenses, and the demand of an optical glass having a refractive index (nd) of 1.75 or more and an Abbe's number (vd) of 35 or more is especially large.

In addition, as to the performance required for the optical glass, not only characteristics including a refractive index, an Abbe's number and a degree of coloration but also the matter that a fluctuation in properties in the actual use environment is small are frequently required. This is because in the case where imaging properties largely change in the actual use environment, an optical element such as lenses or prisms is fixed by a tool in an optical instrument, and therefore, thermal expansion of the optical element is caused due to a change in temperature of the use environment (for example, a change in temperature in the inside of a casing, use at a high temperature, etc.), whereby a stress is generated in the optical element due to a difference in a coefficient of expansion from a fixing tool, and as a result, birefringence is generated in the optical element to cause a change in imaging properties.

Then, imaging properties designed on the basis of optical constants obtained under a fixed temperature condition (chiefly at around room temperature) such as a refractive index or an Abbe's number are not realized in the actual use environment. That is, the design must be made by supposing a use environment and expecting complicated fluctuations in properties at the time of optical design. This is not favorable from the standpoint of optical design.

Separately from the viewpoint on the optical design, in recent years, it is required more and more that an environmental load is small at the time of manufacturing of an optical glass or processing of an optical element.

Specifically, when an optical glass contains an environmentally harmful component such as lead (Pb) compounds or arsenic (As) compounds, a special measure is required for preventing the diffusion of a pollutant into air or water. Furthermore, the use of not harmful components but a large quantity of scarce mineral resources represented by tantalum (Ta) or the like involves disadvantages that not only are the production costs high, but also costs or labors for resource recovery are needed.

Optical glasses having a refractive index (nd) of 1.75 or more and an Abbe's number (vd) of 35 or more are disclosed in, for example, JP-A-2005-306732, JP-A-2002-284542, JP-A-2004-161506 and JP-A-2006-248897.

Though the glasses disclosed in JP-A-2005-306732, JP-A-2002-284542, JP-A-2004-161506 and JP-A-2006-248897 do not contain a lead (Pb) compound or an arsenic (As) compound in a glass composition thereof, all of these patent documents do not take into consideration a fluctuation in imaging properties in the actual use environment. Furthermore, JP-A-2002-284542 discloses a high-refractive index, low-dispersion glass with reduced tantalum (Ta). However, since this glass is required to contain a large quantity of ZnO, the fluctuation in imaging properties is large so that a disadvantage is easily generated from the standpoint of optical design. In addition, in recent years, as to ZnO, there is an environmental problem that influences against the water quality are a matter of concern.

SUMMARY OF THE INVENTION

Under these circumstances, an object of the invention is to provide a high-refractive index, low-dispersion optical glass which is small in a change of imaging properties due to a change in temperature of the use environment without using large qualities of components which are high in an environmental load and scarce mineral resources.

In order to achieve the foregoing object, the present inventors made extensive and intensive investigations. As a result, it has been found that by containing $SiO_2$, $B_2O_3$ and $La_2O_3$ as essential components and regulating a ratio of the constitutional components, a high-refractive index, low-dispersion optical glass which is small in a change of imaging properties due to a change in temperature of the use environment, specifically one capable of realizing an absolute value of multiplication ($\alpha \times \beta$) of an average coefficient of linear expansion ($\alpha$) at from $-30$ to $+70°$ C. and a photoelastic constant ($\beta$) at a wavelength of 546.1 nm of not more than $130 \times 10^{-12°}$ $C.^{-1} \times nm \times cm^{-1} \times Pa^{-1}$ can be manufactured without using large qualities of components which are high in an environmental load and scarce mineral resources, leading to accomplishment of the invention.

(1) An optical glass having an absolute value of multiplication ($\alpha \times \beta$) of an average coefficient of linear expansion ($\alpha$) at from $-30$ to $+70°$ C. and a photoelastic constant ($\beta$) at a wavelength of 546.1 nm of not more than $130 \times 10^{-12°}$ $C.^{-1} \times nm \times cm^{-1} \times Pa^{-1}$; and containing more than 0% of $SiO_2$, $B_2O_3$ and $La_2O_3$, more than 13% and less than 20% of ($ZrO_2+Nb_2O_5$) and less than 2.0% of ZnO in terms of % by mass on the oxide basis.

(2) The optical glass as set forth above in (1), having optical constants of a refractive index (nd) in the range of from 1.75 to 2.00 and an Abbe's number (vd) in the range of from 35 to 55.

(3) The optical glass as set forth above in (1) or (2), containing more than 1.0% and less than 12.0% of $SiO_2$, from 8.0 to 35.0% of $B_2O_3$ and from 25.0 to 50.0% of $La_2O_3$ in terms of % by mass on the oxide basis.

(4) The optical glass as set forth above in any one of (1) to (3), having an $SiO_2/B_2O_3$ ratio of more than 0 and less than 0.6 and a ($ZnO+Y_2O_3$)/$La_2O_3$ ratio of less than 0.5 in terms of % by mass on the oxide basis.

(5) The optical glass as set forth above in any one of (1) to (4), containing from 0.0 to 40.0% of $Gd_2O_3$ and/or from 0.0 to 15.0% of $Y_2O_3$ and/or from 0.0 to 15.0% of $ZrO_2$ and/or from 0.0 to 25.0% of $Ta_2O_5$ and/or from 0.0 to 18.0% of $Nb_2O_5$ and/or from 0.0 to 10.0% of $WO_3$ in terms of % by mass on the oxide basis.

(6) The optical glass as set forth above in any one of (1) to (5), containing from 0.0 to 0.1% of $GeO_2$ and/or from 0.0 to 1.0% of $Yb_2O_3$ and/or from 0.0 to 1.0% of $Ga_2O_3$ and/or from 0.0 to 1.0% of $Bi_2O_3$ in terms of % by mass on the oxide basis; and not containing a lead compound inclusive of PbO and an arsenic compound inclusive of $As_2O_3$.

(7) The optical glass as set forth above in any one of (1) to (6), having an absolute value of multiplication ($\alpha \times \beta$) of an average coefficient of linear expansion ($\alpha$) at from $-30$ to $+70°$ C. and a photoelastic constant ($\beta$) at a wavelength of 546.1 nm of not more than $110 \times 10^{-12}$ °$C.^{-1} \times nm \times cm^{-1} \times Pa^{-1}$.

(8) The optical glass as set forth above in any one of (1) to (7), having a $(Ta_2O_5+Nb_2O_5+WO_3)/(Gd_2O_3+Y_2O_3)$ rat more than 0.05 and less than 1.30 in terms of % by mass on the oxide basis.

(9) The optical glass as set forth above in any one of (1) to (8), containing from 0 to 5.0% of $Li_2O$ and/or from 0 to 5.0% of $Na_2O$ and/or from 0 to 5.0% of $K_2O$ and/or from 0 to 5.0% of $Cs_2O$ and/or from 0 to 5.0% of MgO and/or from 0 to 5.0% of CaO and/or from 0 to 5.0% of SrO and/or from 0 to 5.0% of BaO and/or from 0 to 3.0% of $TiO_2$ and/or from 0 to 3.0% of $SnO_2$ and/or from 0 to 3.0% of $Al_2O_3$ and/or from 0 to 5.0% of $P_2O_5$ and/or from 0 to 5.0% of $Lu_2O_3$ and/or from 0 to 3.0% of $TeO_2$ and/or from 0 to 2.0% of $Sb_2O_3$ and/or from 0 to 3.0% as F in total of fluorides obtained by substituting a part or the whole of one or two or more of these metal oxides in terms of % by mass on the oxide basis.

(10) The optical glass as set forth above in any one of (1) to (9), containing less 3.5% of $Y_2O_3$ in terms of % by mass on the oxide basis.

(11) The optical glass as set forth above in any one of (1) to (10), wherein $(2 \times ZnO+TiO_2+WO_3)$ is less than 4 in terms of % by mass on the oxide basis.

(12) An optical glass containing more than 1.5% and less than 11.0% of $SiO_2$, from 9.0 to 28.0% of $B_2O_3$, from 30.0 to 50.0% of $La_2O_3$, from 0 to 3.0% of $Y_2O_3$, from 0 to 30.0% of $Gd_2O_3$, from 0 to 10.0% of $ZrO_2$, from 0 or more and less than 2.0% of ZnO and from 5.0 to 16.0% of $Nb_2O_5$ and/or from 0.0 to 1.5% of $Sb_2O_3$ and/or from 0.0 to 2.0% of $Al_2O_3$ in terms of % by mass on the oxide basis; having optical constants of a refractive index (nd) in the range of from 1.80 to 1.90 and an Abbe's number (vd) in the range of from 37 to 45; and having an absolute value of multiplication ($\alpha \times \beta$) of an average coefficient of linear expansion ($\alpha$) at from $-30$ to $+70°$ C. and a photoelastic constant ($\beta$) at a wavelength of 546.1 nm of not more than $105 \times 10^{-12}$ °$C.^{-1} \times nm \times cm^{-1} \times Pa^{-1}$.

(13) An optical element comprising the optical glass as set forth above in any one of (1) to (12) as a matrix.

(14) An optical element prepared by reheat press-forming of the glass as set forth above in any of (1) to (12).

(15) An optical instrument using the optical element as set forth above in (13) or (14).

By employing the foregoing embodiments, it is possible to provide a high-refractive index, low-dispersion optical glass in which imaging properties are hardly affected by a change in temperature of the use environment and which has a refractive index (nd) of 1.75 or more and an Abbe's number (vd) of 35 or more without using large qualities of components which are high in an environmental load and scarce mineral resources.

DESCRIPTION OF THE PREFERRED EMBODIMENTS

As described previously, the optical glass of the invention has a characteristic feature that an absolute value of multiplication ($\alpha \times \beta$) of an average coefficient of linear expansion ($\alpha$) at from $-30$ to $+70°$ C. and a photoelastic constant ($\beta$) at a wavelength of 546.1 nm takes an extremely small value. This ($\alpha \times \beta$) index is a parameter which becomes an index exhibiting a change value in imaging properties in the use environment. It is meant that the larger a value of the average coefficient of linear expansion ($\alpha$), the larger a coefficient of expansion (volume change) of an optical element against the temperature change in the use environment. Therefore, it is meant that a large thermal stress is generated in the optical element to be fixed by a tool or the like. Furthermore, it is meant that the larger a value of the photoelastic constant ($\beta$), the larger the birefringence to be generated by the generated thermal stress. That is, it is suggested that the smaller the value of ($\alpha \times \beta$), the smaller a change in imaging properties in the use environment. Since the imaging properties in the actual use environment is faithful with an optical design value to be calculated on the basis of values of physical properties in the vicinity of room temperature, there is an advantage that it is not necessary to carry out a complicated optical simulation on the supposition of various use environments.

It is intended that the optical glass of the invention is able to be used chiefly for cameras or projectors. In order that the imaging properties desired at the time of optical design may be easily realized even in the case where a change in temperature of the actual use environment is generated, the absolute value of ($\alpha \times \beta$) is preferably not more than $130 \times 10^{-12}$ °$C.^{-1} \times nm \times cm^{-1} \times Pa^{-1}$; more preferably not more than $110 \times 10^{-12}$ °$C.^{-1} \times nm \times cm^{-1} \times Pa^{-1}$, and most preferably not more than $105 \times 10^{-12}$ °$C.^{-1} \times nm \times cm^{-1} \times Pa^{-1}$.

In addition to the foregoing imaging properties and environmental load in the actual use environment, it is preferable from needs on the optical design that the optical glass of the invention has high refractive index and low dispersibility. In particular, the refractive index is preferably 1.75 or more, more preferably 1.80 or more, and most preferably 1.81 or more. Though an upper limit of the refractive index is not particularly provided, it is in general not more than 2.00, more preferably not more than 1.90, and most preferably not more than 1.85.

An Abbe's number is preferably 35 or more, more preferably 37 or more, and most preferably 40 or more. Though an upper limit of the Abbe's number is not particularly provided, it is in general not more than 55, more preferably not more than 45, and most preferably not more than 44.

The components to be contained in the optical glass of the invention are hereunder described.

The content of each of the components to be used in the invention is expressed on the oxide basis. On the assumption that oxides, composite salts, metal fluorides and the like which are used as raw material of constitutional components of the glass of the invention are all decomposed and converted into oxides at the time of melting, the expression on the oxide basis as referred to herein refers to % by mass of a formed oxide of each of the components relative to the whole of the composition. However, the content of a fluorine component is one expressing a mass of an F atom to be actually contained in terms of a mass percentage relative to 100% of the total mass on the oxide basis.

An $SiO_2$ component is an essential component having effects for accelerating the stable formation of a glass and suppressing devitrification and stria which are undesirable as an optical glass and capable of increasing the viscosity of a glass. However, when the $SiO_2$ component is contained in excess, the refractive index (nd) is easy to become small, and the photoelastic constant ($\beta$) tends to noticeably increase. As a result, desirable properties are hardly obtainable. In consequence, an upper limit of the content of the $SiO_2$ component is preferably less than 12.0% by mass, more preferably less than 11% by mass, and most preferably less than 10% by mass.

In the invention, a lower limit of the content of the $SiO_2$ component is not particularly provided. However, in view of the matters that the elution of ZnO which affects the water pollution can be selectively controlled and that the viscosity against the devitrification temperature can be increased, $SiO_2$ is contained preferably in an amount of more than 1.0% by mass, more preferably in an amount of more than 1.5% by mass, and most preferably in an amount of more than 1.6% by mass. Though the $SiO_2$ component can be contained in an arbitrary raw material form, it is preferable to introduce the $SiO_2$ component in a form of an oxide (SiO2), $K_2SiF_6$ or $Na_2SiF_6$.

Similar to the SiO2 component, a $B_2O_3$ component is an indispensable component for the purposes of accelerating the stable formation of a glass and realizing a small average coefficient of linear expansion. However, when the amount of the $B_2O_3$ component is too high, the refractive index (nd) is easy to become small; the photoelastic constant ($\beta$) tends to noticeably increase; the viscosity decreases; and the yield is easily lowered. In consequence, an upper limit of the content of the $B_2O_3$ component is preferably 35% by mass, more preferably 28% by mass, and the most preferably 27% by mass. Though a lower limit of the $B_2O_3$ content is not particularly provided, for the purpose of making it easily to stabilize the glass, $B_2O_3$ is contained preferably in an amount of 8.0% by mass or more, more preferably in an amount of 9% by mass or more, and most preferably in an amount of 10% by mass or more. Though the $B_2O_3$ component can be contained in a raw material form such as $H_3BO_3$, $Na_2B_4O_7$, $Na_2B_4O_7 \cdot 10H_2O$ or $BPO_4$, it is preferably introduced in a form of $H_3BO_3$.

Furthermore, by regulating a mass % ratio of $SiO_2/B_2O_3$ at a prescribed value, not only is an effect for increasing solubility of the raw materials and stability of the glass obtainable, but also an effect for increasing the average coefficient of linear expansion ($\alpha$) is obtainable. In addition, since the viscosity is controlled constant while ensuring the stability, this ratio is a very important ratio which also advantageously affects the yield. However, when this value is too large, not only does the average coefficient of linear expansion ($\alpha$) increase, but also a melt residue (chiefly a sparingly fusible crystal containing $SiO_2$) is easily generated at the time of glass melting, and the productivity is deteriorated, thereby possibly adversely affecting the internal material quality. In consequence, the mass % ratio of $SiO_2/B_2O_3$ is preferably more than 0 and less than 0.6, more preferably in the range of from 0.03 to 0.59, and most preferably in the range of from 0.05 to 0.58.

An $La_2O_3$ component is an essential component having, in addition to an effect for increasing the refractive index and making the dispersion small (increasing the Abbe's number), an effect for making the photoelastic constant ($\beta$) small. However, when the $La_2O_3$ component is contained in excess, the glass becomes noticeably instable, thereby easily causing devitrification. In consequence, an upper limit of the content of the $La_2O_3$ component is preferably 50% by mass, more preferably 49.5% by mass, and most preferably 49.0% by mass. Though a lower limit of the $La_2O_3$ component is not particularly provided, for the purpose of easily realizing high refractive index and low dispersion, $La_2O_3$ is contained preferably in an amount of 25% by mass or more, more preferably in an amount of 30% by mass or more, and most preferably in an amount of 35% by mass or more. Though the $La_2O_3$ component can be contained in an arbitrary raw material form, it is preferably introduced in a form of an oxide ($La_2O_3$) or a nitrate or a nitrate hydrate ($La(NO_3)_3 \cdot XH_2O$ (X is an arbitrary integer)).

A ZnO component has an effect for enhancing melting properties of a glass. However, in particular, the ZnO component makes the $\beta$ value large, and therefore, it abruptly increases the value of ($\alpha \times \beta$), thereby easily causing a disadvantage that a change in imaging properties in the use environment is increased.

In addition, in recent years, as to ZnO, influences against the water quality are a matter of concern as seen in lead and copper. In the optical glass, it is problematic that the ZnO component elutes into wastewater or the like, thereby brining about water pollution. Therefore, it is preferable that the content of the ZnO component is small from the environmental standpoint. In consequence, the range of the content of the ZnO component is preferably less than 2.0% by mass, and more preferably less than 1% by mass. It is the most preferable that the ZnO component is not contained.

Similar to the $La_2O_3$ component, a $Gd_2O_3$ component is an arbitrary component having an effect for increasing the refractive index and making the dispersion small. In addition, when the $Gd_2O_3$ component is coexistent together with the $La_2O_3$ component, the $Gd_2O_3$ component also has an effect for decreasing the devitrification temperature, and therefore, it can be arbitrarily contained. However, when the $Gd_2O_3$ component is contained in excess, the devitrification is easily generated similar to the case in the $Gd_2O_3$ component. In consequence, an upper limit value of the content of the $La_2O_3$ component is preferably 40% by mass, more preferably 30% by mass, and most preferably 25% by mass. Though the $Gd_2O_3$ component can be introduced in an arbitrary raw material form, it is preferably introduced in a form of an oxide ($Gd_2O_3$) or a fluoride ($GdF_3$).

A $Y_2O_3$ component is an arbitrary component having an effect for regulating the refractive index and the dispersion. However, in particular, when the $Y_2O_3$ component is contained in excess, the devitrification temperature increases, the yield is abruptly lowered, and there is a possibility that desirable optical constants are not obtainable. An upper limit value of the content of the $Y_2O_3$ component is preferably 15% by mass, more preferably 3.5% by mass, and most preferably 3% by mass. Though the $Y_2O_3$ component can be introduced in an arbitrary raw material form, it is preferably introduced in a form of an oxide ($Y_2O_3$) or a fluoride ($YF_3$). So far as the content of the $Y_2O_3$ component falls within the foregoing range, there is no particular technical disadvantage. However, $Y_2O_3$ is the scarcest mineral resource of the components which are able to realize high reactive index and low dispersion properties, and therefore, in case of taking into consideration manufacturing costs, the content of the $Y_2O_3$ component is preferably less than 2.9% by mass.

A $ZrO_2$ component is an arbitrary component having an effect for increasing the refractive index (nd) and enhancing the resistance to devitrification. However, the $ZrO_2$ component is a sparingly fusible component, and therefore, when it is contained in excess, dissolution at a high temperature at the time of manufacturing of a glass is unavoidable, and an energy loss is easy to become large. In consequence, an upper limit of the content of the $ZrO_2$ component is preferably 15% by mass, more preferably 10% by mass, and most preferably 8% by mass; and a lower limit of the content of the $ZrO_2$ component is preferably 1% by mass, more preferably 2% by mass, and most preferably 3% by mass. In the case where even when the $ZrO_2$ component is not added, devitrification of a glass is not generated, it does not matter that the $ZrO_2$ component is not contained. Though the $ZrO_2$ component can be introduced in an arbitrary raw material form, it is preferably introduced in a form of an oxide ($ZrO_2$) or a fluoride ($ZrF_4$).

A $Ta_2O_5$ component is an arbitrary component having an effect for increasing the refractive index and stabilizing a glass. However, the $Ta_2O_5$ component is a scarce mineral resource, and its raw material costs are high. Therefore, it is preferable that its content is as small as possible. In addition, since the $Ta_2O_5$ component is a sparingly fusible component, not only is dissolution at a high temperature at the time of manufacturing of a glass unavoidable, but also the $Ta_2O_5$ component has properties for increasing the photoelastic constant ($\beta$). Therefore, an upper limit of the content of the $Ta_2O_5$ component is preferably 25% by mass, and more preferably 20% by mass. It is the most preferable that the $Ta_2O_5$ component is not contained. Though the $Ta_2O_5$ component can be introduced in an arbitrary raw material form, it is preferably introduced in a form of an oxide ($Ta_2O_5$).

An $Nb_2O_5$ component is an arbitrary component capable of increasing the refractive index without deteriorating the transmittance and having an effect for stabilizing a glass. However, since the $Nb_2O_5$ component is a sparingly fusible component, not only is dissolution at a high temperature at the time of manufacturing of a glass unavoidable, but also the $Nb_2O_5$ component has properties for increasing the photoelastic constant ($\beta$). Therefore, an upper limit of the content of the $Nb_2O_5$ component is preferably 18% by mass, more preferably 16% by mass, and most preferably 12% by mass. In the invention, though it does not matter that the $Nb_2O_5$ component is not contained, for the purpose of regulating the refractive index, the $Nb_2O_5$ component can be contained preferably in an amount of 1% by mass, more preferably in an amount of 5% by mass, and most preferably in an amount of 7% by mass as an lower limit. In addition, though the $Nb_2O_5$ component can be introduced in an arbitrary raw material form, it is preferably introduced in a form of an oxide ($Nb_2O_5$).

A $WO_3$ component is an arbitrary component having an effect for regulating the refractive index and the dispersion and enhancing the resistance to devitrification of a glass. However, when the $WO_3$ component is contained in excess, coloration of a glass becomes noticeable, and in particular, the transmittance in a visible-short wavelength region is easy to become low. In consequence, an upper limit of the content of the $WO_3$ component is preferably 10% by mass, more preferably 8% by mass, and most preferably 6% by mass. Though the $WO_3$ component can be introduced in an arbitrary raw material form, it is preferably introduced in a form of an oxide ($WO_3$).

The optical glass of the invention has a characteristic feature that by regulating a value of ($ZrO_2+Na_2O_5$) within a prescribed range in terms of % by mass on the oxide basis, a glass having a higher refractive index and a lower devitrification temperature is easily obtainable. The value of ($ZrO_2+Na_2O_5$) is preferably in the range of more than 13.0% and less than 20.0%, more preferably in the range of from 13.05 to 18.0%, and most preferably in the range of from 13.1 to 16.0%.

In the optical glass of the invention, in order to make it easy to realize a prescribed Abbe's number, it is preferable that a ($Ta_2O_5+Nb_2O_5+WO_3$)/($Gd_2O_3+Y_2O_3$) ratio in terms of % by mass, as a ratio of a total sum of $Ta_2O_5$, $Nb_2O_5$ and $WO_3$, which is strong in an effect for increasing the dispersion, to a total sum of $Gd_2O_3$ and $Y_2O_3$, from which an effect for making the dispersion small, is regulated within a prescribed range. The ($Ta_2O_5+Nb_2O_5+WO_3$)/($Gd_2O_3+Y_2O_3$) ratio is preferably in the range of more than 0.05 and less than 1.30, more preferably in the range of from 0.1 to 1.0, and most preferably in the range of from 0.2 to 0.9.

In the optical glass of the invention, by regulating a ($ZnO+Y_2O_3$)/$La_2O_3$ ratio in terms of % by mass within a prescribed range, an effect for forming extremely stably an optical glass capable of realizing a desired multiplication ($\alpha\times\beta$) is obtainable. In consequence, the ($ZnO+Y_2O_3$)/$La_2O_3$ ratio is preferably less than 0.5, more preferably less than 0.2, and further preferably less than 0.1.

A $GeO_2$ component is an arbitrary component which can be added for the purposes of regulating the refractive index and regulating the viscosity of a molten glass. Since the $GeO_2$ component is a scarce mineral resource and is expensive, its content is preferably not more than 0.1% by mass. It is more preferable that the $GeO_2$ component is not contained at all.

Each of $Yb_2O_3$, $Ga_2O_3$ and $Bi_2O_3$ components can be arbitrarily added for the purpose of regulating the refractive index and is a component having an effect for increasing the photoelastic constant ($\beta$). However, since these components are also a scarce mineral resource, an upper limit of the content of each of these components is preferably 1.0% by mass, and more preferably 0.5% by mass. It is the most preferable that each of these components is not contained. Though each of the $Yb_2O_3$, $Ga_2O_3$ and $Bi_2O_3$ components can be introduced in an arbitrary raw material form, it is preferably introduced in a form of an oxide ($Yb_2O_3$, $Ga_2O_3$ or $Bi_2O_3$).

Since a lead compound such as PbO and an arsenic compound such as $As_2O_3$ are a component which is high in an environmental load, it is desirable that these compounds are not contained at all except for unavoidable incorporation.

In the optical glass of the invention, by regulating a value expressed by the formula: ($2\times ZnO+TiO_2+WO_3$) in terms of % by mass on the oxide basis within a prescribed range, a glass capable of realizing a desired multiplication ($\alpha\times\beta$) and having excellent imaging properties in the actual use environment is obtainable, and a stable glass with excellent transmittance can be obtained. In addition, even when ZnO is not contained, what the value expressed by the formula: ($2\times ZnO+TiO_2+WO_3$) is regulated is an important factor for easily realizing both high refractive index and low dispersion and small ($\alpha\times\beta$) value. In consequence, the value expressed by the formula: ($2\times ZnO+TiO_2+WO_3$) is preferably less than 4, more preferably less than 3.5, and most preferably less than 3.

Alkali metal oxide components (for example, $Li_2O$, $Na_2O$, $K_2O$, $Cs_2O$) are an arbitrary component having an effect for enhancing melting properties of a glass. However, when these components are contained in excess, the dispersion is easy to become large; the average coefficient of linear expansion ($\alpha$) is easy to increase; the refractive index is easy to become low; and the glass becomes instable so that an undesirable phenomenon such as the generation of devitrification is caused. In consequence, the content of each of these components is preferably in the range of from 0.0 to 5.0%. An upper limit of the content of these components is more preferably 4.5% for the $Li_2$, $Na_2O$ and $K_2O$ components and 4.0% for the $Cs_2O$ component, respectively. The upper limit of the content of the $LiO_2$ component is most preferably 2.0%; and it is the most preferable that the $Na_2O$, $K_2O$ and $Cs_2O$ components are not contained at all. Though the alkali metal oxide components can be introduced in various forms such as a carbonate (for example, $Li_2CO_3$, $Na_2CO_3$, $K_2CO_3$, $Cs_2CO_3$), a nitrate (for example, $LiNO_3$, $NaNO_3$, $KNO_3$, $CsNO_3$), a fluoride (for example, LiF, NaF, KF, $KHF_2$) or a composite salt (for example, $Na_2SiF_6$, $K_2SiF_6$), they are preferably introduced in a form of a carbonate and/or a nitrate, respectively.

Alkaline earth metal oxide components (for example, MgO, CaO, SrO, BaO) are an arbitrary component having an effect for making the refractive index and the photoelastic constant of a glass small. However, when these components are contained in excess, it is difficult to realize desired optical constants (in particular, a refractive index), and in particular, the resistance to devitrification is easily deteriorated in the composition system of the invention. In consequence, the content of each of these components is preferably in the range of from 0.0 to 5.0% by weight. An upper limit of the content of these components is more preferably 4.0% for the MgO and CaO components and 4.5% for the SrO and BaO components, respectively. Though it is the most preferable that the MaO component is not contained at all, the upper limit is most preferably 3.0% for the CaO component and 4.0% for the SrO and BaO components, respectively. Though the alkaline earth metal oxide components can be introduced in various forms such as a carbonate (for example, $MgCO_3$, $CaCO_3$, $BaCO_3$), a nitrate (for example, $Sr(NO_3)_2$, $Ba(NO_3)_2$) or a fluoride (for example, $MgF_2$, $CaF_2$, $SrF_2$, $BaF_2$), they are preferably introduced in a form of a carbonate and/or a nitrate and/or a fluoride.

When a $TiO_2$ component is added in a small amount, it has an effect for decreasing the devitrification temperature and can be arbitrarily contained for the purpose of regulating the refractive index and the Abbe's number. However, when the $TiO_2$ component is contained in excess, coloration of a glass is easy to become noticeable, and in particular, the transmittance at a visible-short wavelength (not longer than 500 nm) tends to be deteriorated. Inconsequence, an upper limit of the content of the $TiO_2$ component is preferably 3.0% by mass, and more preferably 2.0% by mass. It is the most preferable that the $TiO_2$ component is not contained at all. Though the $TiO_2$ component can be introduced in an arbitrary raw material form, it is preferably introduced in a form of an oxide ($TiO_2$).

An $SnO_2$ component is an arbitrary component having an effect of inhibition of oxidation or clarification of a molten glass and an effect for preventing deterioration in transmittance against the irradiation with light. However, when the $SnO_2$ component is contained in excess, there is a possibility that coloration of a glass is generated due to reduction of the molten glass or a possibility that it forms an alloy together with dissolution equipment (in particular, a noble metal such as Pt), thereby breaking the equipment. In consequence, an upper limit of the content of the $SnO_2$ content is preferably 3.0% by mass, more preferably 2.0% by mass, and most preferably 1.0% by mass. Though the $SnO_2$ component can be introduced in an arbitrary raw material form, it is preferably introduced in a form of an oxide (for example, SnO, $SnO_2$) or a fluoride (for example, $SnF_2$, $SnF_4$).

An $Al_2O_3$ component is an arbitrary component having an effect for enhancing the chemical durability of an optical glass and an optical element or enhancing the resistance to devitrification of a molten glass. When the $Al_2O_3$ component is contained in excess, the refractive index is noticeably lowered, and the photoelastic constant is easy to become large. In consequence, an upper limit of the content of the $Al_2O_3$ component is preferably 3.0% by mass, more preferably 2.0% by mass, and most preferably 1.0% by mass. Though the $Al_2O_3$ component can be introduced in an arbitrary raw material form, it is preferably introduced in a form of an oxide ($Al_2O_3$), a hydroxide ($Al(OH)_3$) or a fluoride ($AlF_3$).

A $P_2O_5$ component is an arbitrary component having an effect for enhancing melting properties of a glass. However, when the $P_2O_5$ component is contained in excess, the resistance to devitrification of a glass is easily deteriorated noticeably so that a devitrification-free optical glass is hardly obtainable. In consequence, an upper limit of the content of the $P_2O_5$ component is preferably 5.0% by mass, and more preferably 1.0% by mass. It is the most preferable that the $P_2O_5$ component is not contained at all. Though the $P_2O_5$ component can be introduced in an arbitrary raw material form, it is preferably introduced in a form of $Al(PO_3)_3$, $Ca(PO_3)_2$, $Ba(PO_3)_2$, $BPO_4$ or $H_3PO_4$.

Similar to the $La_2O_3$, $Gd_2O_3$ and $Y_2O_3$ components, an $Lu_2O_3$ component is an arbitrary component having an effect for realizing high refractive index and low dispersion. However, since the $Lu_2O_3$ component is a scarce mineral resource, it is not preferable that the $Lu_2O_3$ component is contained in excess. In consequence, an upper limit of the content of the $Lu_2O_3$ component is preferably 5% by mass, and more preferably 3.0% by mass. It is the most preferable that the $Lu_2O_3$ component is not contained at all. Though the $Lu_2O_3$ component can be introduced in an arbitrary raw material form, it is preferably introduced in a form of an oxide ($Lu_2O_3$).

A $TeO_2$ component is an arbitrary component having an effect for accelerating a clarification action at the time of glass melting. However, when the $TeO_2$ component is contained in excess, coloration of a glass becomes noticeable, and the transmittance is easily deteriorated. In consequence, an upper limit of the content of the $TeO_2$ component is preferably 3% by mass, and more preferably 1.5% by mass. It is the most preferable that the $TeO_2$ component is not contained at all. Though the $TeO_2$ component can be introduced in an arbitrary raw material form, it is preferably introduced in a form of an oxide ($TeO_2$).

An $Sb_2O_3$ component is an arbitrary component having an effect as a defoaming agent of a glass. However, when the $Sb_2O_3$ component is contained in excess, excessive foaming is easy to occur at the time of glass melting, and there is a possibility that it forms an alloy together with dissolution equipment (in particular, a noble metal such as Pt), thereby breaking the equipment. In consequence, an upper limit of the content of the $Sb_2O_3$ component is preferably 2% by mass, more preferably 1.5% by mass, and most preferably 1.0% by mass. Though the $Sb_2O_3$ component can be introduced in an arbitrary raw material form, it is preferably introduced in a form of an oxide (for example, $Sb_2O_3$, $Sb_2O_5$) or $Na_2H_2Sb_2O_7.5H_2O$.

An F component can be arbitrarily contained in an amount in the range of from 0 to 3.0% by mass because it is able to bring about an effect for increasing the Abbe's number or an effect for making the photoelastic constant ($\beta$) small. However, when the F component is contained in an amount exceeding the upper limit, the refractive index is easy to become low, and there is a possibility that the average coefficient of linear expansion ($\alpha$) increases. The upper limit of the content of the F component is more preferably 2.8% by mass, and most preferably 2.5% by mass. The F component is introduced into a glass during introducing a fluoride in the raw material form in the introduction of the foregoing various oxides.

Even in the case where a small amount of each of transition metal components except for Ti, such as V, Cr, Mn, Fe, Co, Ni, Cu, Ag or Mo, is contained singly or in combination, coloration occurs so that absorption is generated at a specific wavelength in the visible range. In an optical glass using a wavelength in the visible range, it is preferable that such a transition metal component is not substantially contained. In addition, as to each of Th, Cd, Tl, Os, Be and Se components, in recent years, there is a tendency that the use of such a component is avoided on the basis of consideration that it is a harmful chemical substance. It is necessary to take measures on the environmental countermeasure in not only a manufacturing step of a glass but also a processing step and disposal after making a product, and therefore, in the case where influences on the environment are seriously considered, it is preferable that these components are not substantially contained.

As set forth above in (13) to (15), the optical glass of the invention is useful as a matrix for preparing an optical element such as lenses or prisms, and by using this optical element for an optical instrument such as cameras or projectors, high-definition and high-precision imaging and projection properties can be realized. While the preparation of an optical element can be achieved according to a method by means of reheat press-forming, grinding and polishing, it does not exclude a method in which a preform is prepared from the optical glass of the invention, and the preform is subjected to precision press-forming.

In the glass composition of the invention, its composition is expressed in terms of % by mass, and therefore, it is not expressed directly in terms of % by mole. However, a composition of the respective components expressed by % by mole on the basis of oxides existing in the glass composition which meets various properties required in the invention is generally as follows.

$SiO_2$: More than 1.0% by mole and less than 20.0% by mole;
$B_2O_3$: 20.0 to 70.0% by mole;
$La_2O_3$: 15.0 to 30.0% by mole;
$Gd_2O_3$: 0.0 to 30.0% by mole; and/or
$Y_2O_3$: 0.0 to 10.0% by mole; and/or
$ZrO_2$: 0.0 to 20% by moles; and/or
$Ta_2O_5$: 0.0 to 10.0% by mole; and/or
$Nb_2O_5$: 0.0 to 12.0% by mole; and/or
$WO_3$: 0.0 to 8.0% by mole; and/or
$GeO_2$: 0.0 to 0.1% by mole; and/or
$Yb_2O_3$: 0.0 to 0.5% by mole; and/or
$Ga_2O_3$: 0.0 to 1.0% by mole; and/or
$Bi_2O_3$: 0.0 to 0.5% by mole; and/or
$Li_2O$: 0 to 20.0% by mole; and/or
$Na_2O$: 0 to 10.0% by mole; and/or
$K_2O$: 0 to 8.0% by mole; and/or
$Cs_2O$: 0 to 3.0% by mole; and/or
$MgO$: 0 to 15.0% by mole; and/or
$CaO$: 0 to 10.0% by mole; and/or
$SrO$: 0 to 8.0% by mole; and/or
$BaO$: 0 to 5.0% by mole; and/or
$TiO_2$: 0 to 5.0% by mole; and/or
$SnO_2$: 0 to 3.0% by mole; and/or
$Al_2O_5$: 0 to 4.0% by mole; and/or
$P_2O_5$: 0 to 5.0% by mole; and/or
$ZnO$: 0 to 15.0% by mole; and/or
$Lu_2O_3$: 0 to 2.0% by mole; and/or
$TeO_2$: 0 to 3.0% by mole; and/or
$Sb_2O_3$: 0 to 1.0% by mole; and/or
F: 0 to 10% by mole

EXAMPLES

The invention is hereunder described in more detail with reference to the following Examples.

Glasses of Examples and glasses of Comparative Examples according to the invention as shown in Tables 1 to 4 were obtained by using usually optical glass raw materials including corresponding oxide, hydroxide, carbonate, nitrate, fluoride, hydroxide and metaphosphate as raw materials of respective components; weighing and mixing them in a prescribed proportion; charging the mixture in a platinum crucible; melting the charged mixture in an electric furnace at a temperature in the range of from 1,200 to 1,400° C. for from 3 to 4 hours depending upon the degree of difficulty of dissolution of a glass composition; stirring the melt for homogenization; after dropping to an appropriate temperature, casting the homogenized melt in a die; and then gradually cooling it.

The obtained optical glass was measured for a refractive index (nd), an Abbe's number (vd), an average coefficient of linear expansion (α) at from −30 to +70° C. and a photoelastic constant (β) at a wavelength of 546.1 nm in the following manners.

(1) Refractive Index (nd) and Abbe's Number (vd):

The measurement was made regarding an optical glass obtained by regulating a temperature drop rate by gradual cooling at −25° C./hour.

(2) Average Coefficient of Linear Expansion (α) at from −30 to +70° C. [$10^{-7}$ °C.$^{-1}$]:

The measurement was made in conformity with a method described in Japanese Optical Glass Industrial Society Standards JOGIS 16-2003 (a measurement method of average coefficient of linear expansion of optical glass in the vicinity of room temperature). A sample having a length of 50 mm and a diameter of 4 mm was used as a specimen.

(3) Photoelastic Constant (β) at a Wavelength of 546.1 nm [$10^{-5} \times nm \times cm^{-1} \times Pa^{-1}$]:

A sample was subjected to double-sided polishing so as to have a disc shape having a diameter of 25 mm and a thickness of 8 mm; and a compression load was applied to the resulting sample in a prescribed direction to measure an optical path difference generated in the center of the glass, thereby determining a photoelastic constant (β) according to a relational expression: δ=β·d·F. An extra-high pressure mercury vapor lamp was used as a light source for the measurement at 546.1 nm. In the foregoing expression, an optical path difference is expressed by δ (nm); a thickness of the glass is expressed by d (cm); and a stress is expressed by F (Pa).

$$(\alpha \times \beta)\text{value}[\times 10^{-12} \text{ °C.}^{-1} \times nm \times cm^{-1} \times Pa^{-1}]: \quad (4)$$

The (α×β) value was calculated by multiplying the values of the foregoing (2) and (3).

TABLE 1

| | 1 | 2 | 3 | 4 | 5 | 6 |
|---|---|---|---|---|---|---|
| $SiO_2$ | 1.80 | 1.90 | 4.75 | 5.00 | 2.00 | 1.90 |
| $B_2O_3$ | 24.49 | 23.42 | 21.91 | 20.64 | 24.57 | 23.13 |
| $Y_2O_3$ | 1.00 | 1.00 | 1.28 | 2.30 | 3.00 | |
| $La_2O_3$ | 39.21 | 41.92 | 42.61 | 42.55 | 39.30 | 43.69 |
| $Gd_2O_3$ | 17.00 | 16.33 | 14.60 | 14.66 | 16.53 | 16.10 |
| $TiO_2$ | | | | | | |
| $ZrO_2$ | 6.50 | 5.63 | 6.59 | 6.00 | 5.60 | 6.64 |
| $Nb_2O_5$ | 8.00 | 8.50 | 8.26 | 8.80 | 9.00 | 8.50 |
| $WO_3$ | 2.00 | | | | | |
| $ZnO$ | | 0.30 | | | | |
| $CaO$ | | 0.50 | | | | |
| $SrO$ | | 0.50 | | | | |
| $BaO$ | | | | | | |
| $Sb_2O_3$ | | | | 0.05 | | 0.05 |
| $Bi_2O_3$ | | | | | | |
| $GeO_2$ | | | | | | |
| $Yb_2O_3$ | | | | | | |
| $Na_2O$ | | | | | | |
| $Al_2O_3$ | | | | | | |
| F | | | | | | |
| $P_2O_5$ | | | | | | |
| Total | | | | | | |
| $ZrO_2 + Nb_2O_5$ | 14.50 | 14.13 | 14.85 | 14.80 | 14.60 | 15.13 |
| $SiO_2/B_2O_3$ | 0.07 | 0.08 | 0.22 | 0.24 | 0.08 | 0.08 |
| $(ZnO + Y_2O_3)/(La_2O_3)$ | 0.03 | 0.03 | 0.03 | 0.05 | 0.08 | 0.00 |
| $(Ta_2O_5 + Nb_2O_5 + WO_3)/(Gd_2O_3 + Y_2O_3)$ | 0.56 | 0.49 | 0.52 | 0.52 | 0.46 | 0.53 |

TABLE 1-continued

| | 1 | 2 | 3 | 4 | 5 | 6 |
|---|---|---|---|---|---|---|
| $2ZnO + TiO_2 + WO_3$ | 2.000 | 0.600 | 0.000 | 0.000 | 0.000 | 0.000 |
| $n_d$ | 1.833 | 1.818 | 1.831 | 1.837 | 1.831 | 1.843 |
| $v_d$ | 41.5 | 43.2 | 42.9 | 42.5 | 42.7 | 42.3 |
| α | 74.00 | 75.00 | 72.00 | 71.00 | 74.00 | 75.00 |
| β | 1.30 | 1.29 | 1.27 | 1.23 | 1.29 | 1.19 |
| α × β | 96 | 97 | 92 | 87 | 95 | 89 |

TABLE 2

| | 7 | 8 | 9 | 10 | 11 | 12 |
|---|---|---|---|---|---|---|
| $SiO_2$ | 4.62 | 3.00 | 1.91 | 1.70 | 2.00 | 1.94 |
| $B_2O_3$ | 22.13 | 23.66 | 24.66 | 24.73 | 24.60 | 24.63 |
| $Y_2O_3$ | 2.61 | 2.81 | | | 0.13 | |
| $La_2O_3$ | 43.32 | 42.61 | 38.00 | 39.92 | 41.95 | 41.92 |
| $Gd_2O_3$ | 12.80 | 13.07 | 20.25 | 16.57 | 16.20 | 16.22 |
| $TiO_2$ | | | | 1.90 | | 0.30 |
| $ZrO_2$ | 6.54 | 6.59 | 6.64 | 6.64 | 4.70 | 7.00 |
| $Nb_2O_5$ | 7.92 | 8.21 | 8.50 | 8.50 | 10.37 | 7.24 |
| $WO_3$ | | | | | | |
| ZnO | | | | | | |
| CaO | | | | | | 0.70 |
| SrO | | | | | | |
| BaO | | | | | | |
| $Sb_2O_3$ | 0.05 | 0.05 | 0.05 | 0.05 | 0.05 | 0.05 |
| $Bi_2O_3$ | | | | | | |
| $GeO_2$ | | | | | | |
| $Yb_2O_3$ | | | | | | |
| $Na_2O$ | | | | | | |
| $Al_2O_3$ | | | | | | |
| F | | | | | | |
| $P_2O_5$ | | | | | | |
| Total | | | | | | |
| $ZrO_2 + Nb_2O_5$ | 14.46 | 14.80 | 15.13 | 15.13 | 15.07 | 14.24 |
| $SiO_2/B_2O_3$ | 0.21 | 0.13 | 0.08 | 0.07 | 0.08 | 0.08 |
| $(ZnO + Y_2O_3)/(La_2O_3)$ | 0.06 | 0.07 | 0.00 | 0.00 | 0.00 | 0.00 |
| $(Ta_2O_5 + Nb_2O_5 + WO_3)/(Gd_2O_3 + Y_2O_3)$ | 0.51 | 0.52 | 0.42 | 0.51 | 0.64 | 0.45 |
| $2ZnO + TiO_2 + WO_3$ | 0.000 | 0.000 | 0.000 | 1.900 | 0.000 | 0.300 |
| $n_d$ | 1.830 | 1.831 | 1.831 | 1.844 | 1.835 | 1.830 |
| $v_d$ | 43.0 | 42.8 | 42.7 | 40.2 | 41.9 | 43.4 |
| α | 73.00 | 74.00 | 74.00 | 75.00 | 76.00 | 76.00 |
| β | 1.26 | 1.26 | 1.31 | 1.31 | 1.29 | 1.27 |
| α × β | 92 | 93 | 97 | 98 | 98 | 96 |

TABLE 3

| | 13 | 14 | 15 | 16 | 17 | 18 |
|---|---|---|---|---|---|---|
| $SiO_2$ | 1.90 | 3.00 | 4.78 | 4.78 | 4.78 | 3.25 |
| $B_2O_3$ | 26.67 | 22.40 | 21.43 | 21.07 | 21.43 | 22.38 |
| $Y_2O_3$ | | 2.62 | 2.30 | 2.30 | 2.00 | 1.28 |
| $La_2O_3$ | 39.92 | 41.59 | 42.03 | 42.03 | 41.80 | 42.61 |
| $Gd_2O_3$ | 16.33 | 14.60 | 14.60 | 14.60 | 14.43 | 14.60 |
| $TiO_2$ | | | | | | |
| $ZrO_2$ | 6.54 | 6.50 | 6.59 | 6.59 | 6.59 | 6.80 |
| $Nb_2O_5$ | 8.50 | 8.54 | 8.21 | 8.21 | 8.21 | 7.92 |
| $WO_3$ | | | | | | |
| ZnO | | | | | | |
| CaO | | | | | | |
| SrO | | | | | | |
| BaO | | | | | | 1.00 |
| $Sb_2O_3$ | 0.05 | 0.03 | 0.06 | 0.06 | 0.06 | |
| $Bi_2O_3$ | | 0.50 | | 0.06 | | |
| $GeO_2$ | | | | 0.10 | | |
| $Yb_2O_3$ | | | | 0.20 | | |
| $Li_2O$ | | | | | | 0.15 |
| $Na_2O$ | | | | | 0.50 | |
| $Al_2O_3$ | | | | | 0.10 | |
| F | | | | | 0.10 | |
| $P_2O_5$ | | 0.22 | | | | |
| Total | | | | | | |
| $ZrO_2 + Nb_2O_5$ | 15.13 | 15.04 | 14.80 | 14.80 | 14.80 | 14.72 |
| $SiO_2/B_2O_3$ | 0.07 | 0.13 | 0.22 | 0.23 | 0.22 | 0.15 |
| $(ZnO + Y_2O_3)/(La_2O_3)$ | 0.00 | 0.06 | 0.05 | 0.05 | 0.05 | 0.03 |
| $(Ta_2O_5 + Nb_2O_5 + WO_3)/(Gd_2O_3 + Y_2O_3)$ | 0.52 | 0.50 | 0.49 | 0.49 | 0.50 | 0.50 |
| $2ZnO + TiO_2 + WO_3$ | 0.000 | 0.000 | 0.000 | 0.000 | 0.000 | 0.000 |
| $n_d$ | 1.820 | 1.837 | 1.834 | 1.831 | 1.832 | 1.836 |
| $v_d$ | 43.1 | 42.6 | 42.8 | 42.9 | 42.9 | 42.7 |
| α | 75.00 | 74.00 | 75.00 | 71.00 | 76.00 | 74.00 |
| β | 1.31 | 1.26 | 1.29 | 1.27 | 1.30 | 1.23 |
| α × β | 98 | 93 | 97 | 90 | 99 | 91 |

TABLE 4

| | Comparison A | Comparison B |
|---|---|---|
| $SiO_2$ | 6.00 | 6.30 |
| $B_2O_3$ | 19.26 | 12.70 |
| $Y_2O_3$ | 2.65 | |
| $La_2O_3$ | 41.25 | 33.60 |
| $Gd_2O_3$ | 13.15 | |
| $TiO_2$ | | 5.00 |
| $ZrO_2$ | 6.00 | 6.50 |
| $Nb_2O_5$ | 7.75 | 2.00 |
| $WO_3$ | | |
| ZnO | 4.08 | 2.50 |
| CaO | | |
| SrO | | |
| BaO | | 31.40 |
| $Sb_2O_3$ | | |
| $Bi_2O_3$ | | |
| $GeO_2$ | | |
| $Yb_2O_3$ | | |
| $Na_2O$ | | |
| $Al_2O_3$ | | |
| F | | |
| $P_2O_5$ | | |
| Total | 100.04 | 100.00 |
| $ZrO_2 + Nb_2O_5$ | 13.75 | 8.50 |
| $SiO_2/B_2O_3$ | 0.31 | 0.50 |
| $(ZnO + Y_2O_3)/(La_2O_3)$ | 0.16 | 0.07 |
| $(Ta_2O_5 + Nb_2O_5 + WO_3)/(Gd_2O_3 + Y_2O_3)$ | 0.49 | — |
| $2ZnO + TiO_2 + WO_3$ | 8.160 | 10.000 |
| $n_d$ | 1.83104 | 1.82546 |
| $v_d$ | 43.1 | 38.6 |
| α | 80 | 82 |
| β | 1.64 | 1.61 |
| α × β | 131 | 132 |

Furthermore, the glasses of the Examples as shown in Tables 1 to 3 were subjected to cold processing or reheat press-forming. As a result, they could be stably processed into various lens or prism shapes without causing problems such as devitrification.

The thus obtained optical glasses of the invention had a very small (α×β) value and were small in a change in imaging properties due to the external environment such as humidity. Furthermore, the thus prepared lenses or prisms were mounted in a camera or a projector and confirmed for the imaging properties. As a result, the imaging properties to be expected in an optical design utilizing optical constants obtained at room temperature could also be reproduced at the time of operation at a high temperature (about 50 to 70° C.).

On the other hand, the Comparisons A and B contained a large quantity of ZnO, had a large constant ($\alpha \times \beta$) and were insufficient in imaging properties adapted with the actual environment so that they were not satisfactory for mounting in an optical instrument such as a projector. Furthermore, these Comparisons A and B are high in a possibility of elution of ZnO so that they are not preferable from the environmental standpoint. In addition, the Comparison B contained a large quantity of $TiO_2$ and was distinctly poor in transmittance through visual inspection so that it was not favorable for the use as an optical element.

While the invention has been described in detail and with reference to specific embodiments thereof, it will be apparent to one skilled in the art that various changes and medications can be made herein without departing from the spirit and scope thereof.

What is claimed is:

1. An optical glass comprising, in terms of % by mass on the oxide basis:
   more than 1.0% and less than 12.0% of $SiO_2$,
   from 8.0 to 35.0% of $B_2O_3$,
   from 25.0 to 50.0% of $La_2O_3$,
   more than 13% and less than 20% of ($ZrO_2+Nb_2O_5$),
   less than 2.0% of ZnO,
   0 to 3.0% of $Y_2O_3$, and
   0 to 2.0% of $TiO_2$,
   wherein a ($Ta_2O_5+Nb_2O_5+WO_3$)/($Gd_2O_3+Y_2O_3$) ratio is more than 0.05 and less than 1.30 in terms of % by mass on the oxide basis,
   the optical glass has an absolute value of a product ($\alpha \times \beta$) is not more than $130 \times 10^{-12}$ °C.$^{-1} \times$nm$\times$cm$^{-1} \times$Pa$^{-1}$, where $\alpha$ is an average coefficient of linear expansion at from $-30$ to $+70°$ C. and $\beta$ is a photoelastic constant at a wavelength of 546.1 nm, and
   the optical glass has optical constants of a refractive index (nd) in the range of from 1.75 to 2.00 and an Abbe's number (vd) in the range of from 35 to 55.

2. The optical glass according to claim 1, having an $SiO_2$/$B_2O_3$ ratio of more than 0 and less than 0.6 and a (ZnO+$Y_2O_3$)/$La_2O_3$ ratio of less than 0.5 in terms of % by mass on the oxide basis.

3. The optical glass according to claim 1, containing from 0.0 to 40.0% of $Gd_2O_3$ and/or from 0.0 to 15.0% of $ZrO_2$ and/or from 0.0 to 25.0% of $Ta_2O_5$ and/or from 0.0 to 18.0% of $Nb_2O_5$ and/or from 0.0 to 10.0% of $WO_3$ in terms of % by mass on the oxide basis.

4. The optical glass according to claim 1, containing from 0.0 to 0.1% of $GeO_2$ and/or from 0.0 to 1.0% of $Yb_2O_3$ and/or from 0.0 to 1.0% of $Ga_2O_3$ and/or from 0.0 to 1.0% of $Bi_2O_3$ in terms of % by mass on the oxide basis; and not containing a lead compound inclusive of PbO and an arsenic compound inclusive of $As_2O_3$.

5. The optical glass according to claim 1, wherein the absolute value of the product ($\alpha \times \beta$) is not more than $110 \times 10^{-12}$ °C.$^{-1} \times$nm$\times$cm$^{-1} \times$Pa$^{-1}$.

6. The optical glass according to claim 1, further containing one or more selected from:
   from 0 to 5.0% of $Li_2O$,
   from 0 to 5.0% of $Na_2O$,
   from 0 to 5.0% of $K_2O$,
   from 0 to 5.0% of $Cs_2O$,
   from 0 to 5.0% of MgO,
   from 0 to 5.0% of CaO,
   from 0 to 5.0% of SrO,
   from 0 to 5.0% of BaO,
   from 0 to 3.0% of $SnO_2$,
   from 0 to 3.0% of $Al_2O_3$,
   from 0 to 5.0% of $P_2O_5$,
   from 0 to 5.0% of $Lu_2O_3$,
   from 0 to 3.0% of $TeO_2$,
   from 0 to 2.0% of $Sb_2O_3$, and
   from 0 to 3.0% as F in total of fluorides obtained by substituting a part or the whole of one or two or more of these metal oxides in terms of % by mass on the oxide basis.

7. The optical glass according to claim 1, wherein ($2 \times$ZnO+$TiO_2$+$WO_3$) is less than 4 in terms of % by mass on the oxide basis.

8. An optical element comprising the optical glass according to claim 1.

9. An optical element prepared by reheat press-forming of the glass according to claim 1.

10. An optical instrument using the optical element according to claim 8.

11. An optical instrument using the optical element according to claim 9.

12. An optical glass, in terms of % by mass on the oxide basis, comprising:
    more than 1.5% and less than 11.0% of $SiO_2$,
    from 9.0 to 28.0% of $B_2O_3$,
    from 30.0 to 50.0% of $La_2O_3$,
    from 0 to 3.0% of $Y_2O_3$,
    from 0 to 2.0% of $TiO_2$,
    from 0 to 30.0% of $Gd_2O_3$,
    from 0 to 10.0% of $ZrO_2$,
    from 0 or more and less than 2.0% of ZnO,
    from 5.0 to 16.0% of $Nb_2O_5$,
    from 0.0 to 1.5% of $Sb_2O_3$, and
    from 0.0 to 2.0% of $Al_2O_3$,
    wherein ($ZrO_2+Nb_2O_5$) is more than 13% and less than 20%, and a ($Ta_2O_5+Nb_2O_5+WO_3$)/($Gd_2O_3+Y_2O_3$) ratio is more than 0.05 and less than 1.30 in terms of % by mass on the oxide basis,
    wherein the optical glass has optical constants of a refractive index (nd) in the range of from 1.80 to 1.90 and an Abbe's number (vd) in the range of from 37 to 45, and
    wherein the optical glass has an absolute value of a product ($\alpha \times \beta$) not more than $130 \times 10^{-12}$ °C.$^{-1} \times$nm$\times$cm$^{-1} \times$Pa$^{-1}$, where $\alpha$ is an average coefficient of linear expansion at from $-30$ to $+70°$ C. and $\beta$ is a photoelastic constant at a wavelength of 546.1 nm.

* * * * *